United States Patent
Bogdan et al.

(10) Patent No.: US 7,562,345 B2
(45) Date of Patent: Jul. 14, 2009

(54) FIRMWARE MANAGEMENT TOOL

(75) Inventors: Brian J. Bogdan, Succasunna, NJ (US); Roger Ellis Doles, Jr., Licking, OH (US); Charles Francis Gullage, Chatham, NJ (US); James Baldwin Salisbury, Randolph, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 973 days.

(21) Appl. No.: 10/648,909

(22) Filed: Aug. 27, 2003

(65) Prior Publication Data

US 2005/0050479 A1  Mar. 3, 2005

(51) Int. Cl.
*G06F 9/44* (2006.01)
(52) U.S. Cl. .............. 717/120; 717/101; 717/102; 717/103
(58) Field of Classification Search ......... 717/101–103, 717/120–123, 168–178
See application file for complete search history.

(56) References Cited

U.S. PATENT DOCUMENTS

| 5,317,729 | A  | * | 5/1994  | Mukherjee et al. ............ 707/3 |
| 5,956,479 | A  | * | 9/1999  | McInerney et al. .......... 717/127 |
| 6,904,591 | B2 | * | 6/2005  | Grala ......................... 717/159 |
| 6,973,466 | B2 | * | 12/2005 | Kaler et al. ................. 707/203 |
| 6,983,457 | B2 | * | 1/2006  | Mitsumori et al. .......... 717/145 |
| 7,089,268 | B2 | * | 8/2006  | Yoshimura et al. .......... 707/201 |
| 7,178,141 | B2 | * | 2/2007  | Piazza ........................ 717/168 |
| 2003/0046681 | A1 | * | 3/2003 | Barturen et al. ............. 717/177 |

OTHER PUBLICATIONS

Henninger, Scott "An Evolutionary Approach to Constructing Effective Software Reuse Repositories"; ACM Transactions on Software Engineering and Methodology, vol. 6, No. 2, Apr. 1997, pp. 111-140.*

* cited by examiner

*Primary Examiner*—William H Wood
(74) *Attorney, Agent, or Firm*—Carlson, Gaskey & Olds

(57) ABSTRACT

A firmware management method and system provides close control over a firmware development process via a firmware management tool and an archive. The archive can be used to store firmware files containing firmware source code in progress as well as finished source code along with its associated object code. The management tool includes an auditing function and a workflow management function so that the status of each firmware file and the work history of that file can be monitored and stored. By providing a centralized location for firmware source and object code, the tool makes it easier to track and modify firmware code at any stage as well as ensures that the code ultimately sent to a chip manufacturer is the final version of the code.

18 Claims, 3 Drawing Sheets

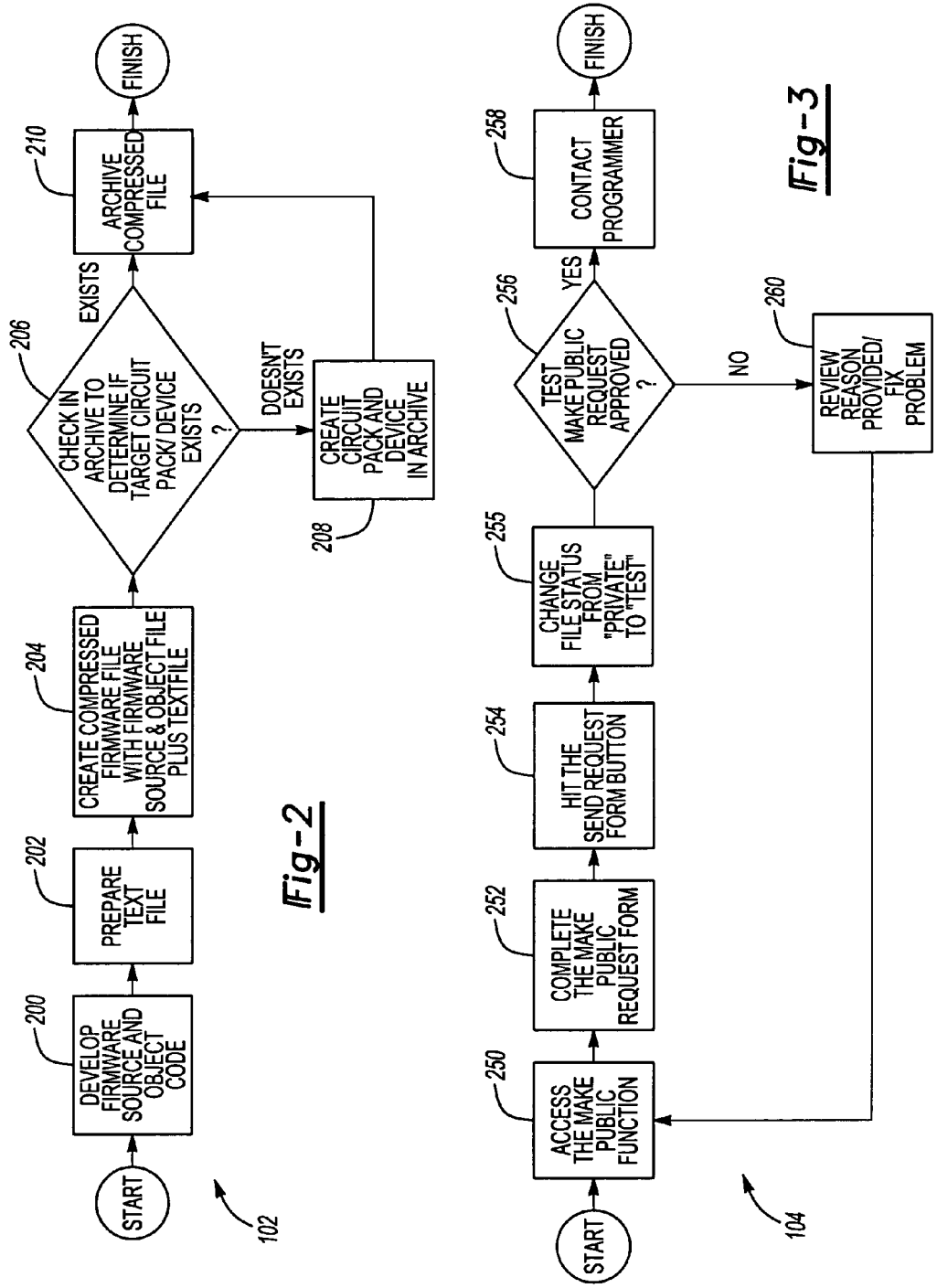

FIRMWARE MANAGEMENT TOOL

BACKGROUND OF THE INVENTION

1. Field of the Invention

The present invention is directed to firmware management, and more particularly to a tool for managing firmware source and object code along with related software.

2. Description of the Related Art

Development of firmware devices, such as field programmable gate arrays (FPGAs) and complex programmable logic devices (CPLDs), usually involves developing firmware code and then burning the code onto chips to produce the firmware. Normally, source code, object code, or both are sent to a remote chip factory. The code is then loaded into a machine to burn into the chips.

Human error may cause the wrong code to be sent to the chip factory. This would cause the wrong code to be burned into the chips. Delays in notifying the chip manufacturer of the error may cause the wrong code to be burned into a large number of chips, which would have to be discarded. Further, because there is currently no known way to archive source files, it can be difficult to match up object files with there corresponding source files if changes in the object files need to be made. Erasing hard disks of personnel leaving the company makes it possible to lose source files completely. The lack of a comprehensive firmware management creates large inefficiencies in firmware development.

There is a desire for a system that can control and manage firmware code through its development stages.

SUMMARY OF THE INVENTION

The present invention is directed to a firmware management method and system that provides close control over a firmware development process. The invention includes a firmware management tool and an archive. The archive can be used to store firmware files containing firmware source code in progress as well as finished source code along with its associated object code. The management tool includes an auditing function and a workflow management function so that the status of each firmware file and the work history of that file can be monitored and stored. In one embodiment, the status of a given firmware file can be Private, where only selected people work in the firmware file can access it; Test, where the firmware file is tested by an authorized group; and Public, where the firmware file is ready for compiling and burning onto chips.

In one embodiment, the firmware management tool provides different levels of access to the firmware files for different users. For example, selected users may be authorized to retrieve only the object code from the archive, while other uses may be authorized to retrieve both the object code and the source code. This ensures that the firmware can be modified without jeopardizing the integrity and confidentiality of the original source code.

The inventive firmware management tool therefore adds a layer of control and monitoring over a firmware development process, ensuring that the object code sent to a chip manufacturer is the correct, final version of the code. The inventive tool also provides a centralized location for firmware source and object code, making it easier to track and modify firmware code at any stage.

BRIEF DESCRIPTION OF THE DRAWINGS

FIG. 2 is a flow diagram of an archive creation process according to one embodiment of the invention;

FIG. 3 is a flow diagram of an archive publication process according to one embodiment of the invention;

DETAILED DESCRIPTION

The invention is generally directed to a firmware management tool that can archive and link object code with their corresponding source files as well as provide an audit trail, making it easy to obtain information on the status of and changes to the code and files.

Figure 1:
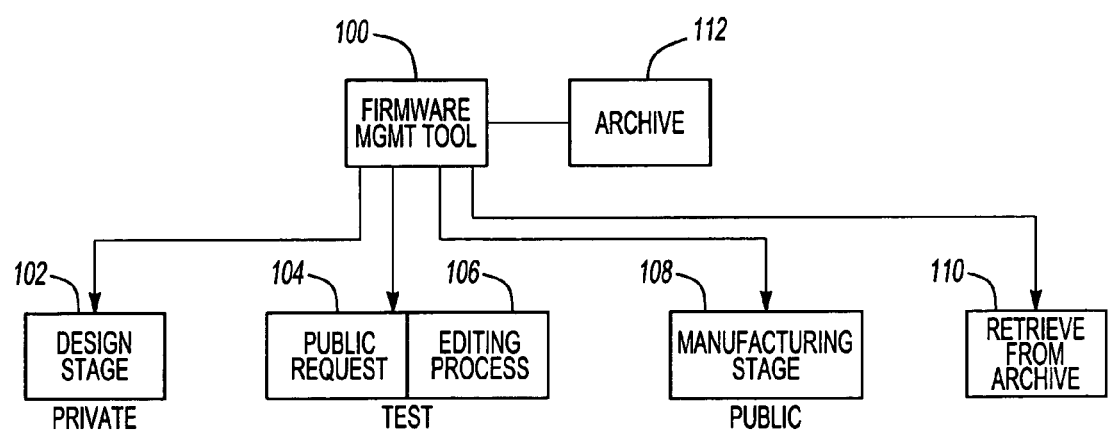
FIG. 1 is a representative diagram of a relationship between elements in a firmware development system incorporating one embodiment of the invention.

FIG. 1 is a block diagram illustrates an operating environment for one embodiment of the invention. The inventive firmware management tool 100 is incorporated into the system to act as an archive base, an audit tool, and a workflow manager to move firmware code between controlled stages during the development process. More particularly, the firmware management tool provides oversight from an initial, private design stage 102 to a public review and approval stages (including a public request stage 104 and an editing process 106, to a manufacturing stage 108 where the firmware code is finally burned onto a chip. The tool also provides an archive retrieval process 110 where firmware code can be retrieved at any time. The firmware management tool 100 can be used in any firmware application development context. For purposes of illustration only, the description below focuses on firmware that is used in a wireless application, but the invention can be applied in other applications as well.

The firmware management tool 100 itself can be implemented in any desired manner, such as through software. An archive portion 112 of the tool 100 can be any memory device, and a user interface 114, such as a web interface, can be used to access the tool 100. Those of skill in the art will understand that the specific implementation of the inventive tool 100 can be adapted to the particular environment in which the tool 100 will be used.

During the design stage 102, a designer develops and tests code to be used in the firmware. Oversight and input by others is not required at this early stage, so the design can keep the firmware code private for his or her own use. The designer may store work in progress by creating an archive in the firmware management tool 100 using the process shown in FIG. 2. As the designer develops firmware source code and object code (block 200), the designer can prepare a text file that contains, for example, documentation for the code being developed (block 202). The source code, object code, and text file for the firmware can then be compressed into a compressed firmware file for storage (block 204).

The tool then checks the archive 112 to see if a target circuit pack or device already exists in the archive database (block 206). As is known in the art, a target circuit pack is a circuit board on which an integrated circuit having the object firmware resides, while a device is the integrated circuit itself. A single target circuit pack may contain multiple devices on which the firmware resides. If the target circuit pack or device does not already exist in the archive, the tool 110 creates a circuit pack and device corresponding to the compressed firmware file in the archive (block 208). After a circuit pack and device for the firmware file have been identified or created, the firmware file is stored in the archive 112 (block 210).

At this point, the firmware file is accessible only to the designer. The designer is therefore free to change and refine the source code, object code, and text file without notice or input by others. The designer can therefore mark the status of the firmware file as "private" in the archive. This status may, for example, block anyone other than the designer from modifying the firmware file or even prevent the firmware file from appearing in archive records when the archive 112 is accessed by other people.

After refining the firmware file to a point where it is ready for testing, the designer may wish to change the status of the firmware file from "Private" to "Public" in the archive 112. By making the file public, the designer One process of making a given archived firmware file public is shown in FIG. 3. In this process, the design may access a "Make Public" function in the tool 100 (block 250) and fill out information in a request form (block 252). In one embodiment, the information in the request form will include an affirmation that all required tests have been completed and passed and that the test results have been stored. The request form may also contain the name of the tester so that an approver can independently verify that the test results are acceptable. Once the information is completed, the designer sends the request (block 254) for review and approval.

At this point, the status of the firmware file is changed from "Private" to "Test" in the archive 112. A firmware file having a "Test" status can be automatically sent to, for example, a separate review group that reviews and tests the firmware code (block 255). In one embodiment, a request will be disapproved if the specified tests or steps in a predetermined testing process have not been completed and if the omissions have not been approved by a management person. The specific steps and testing process will vary depending on the specific firmware file being evaluated and is within the capabilities of those of ordinary skill in the art.

Based on the information in the request form, the review group decides whether to approve or deny the request (block 256). If the review group approves the request, the firmware file status is changed to "Public," indicating that the firmware file is ready to be implemented onto an integrated circuit (block 258). If the review group denies the request, the review group may send a message back to the designer indicating the reasons for the denial and/or suggestions on how to fix problems in the firmware file (block 260). At this point, the designer can modify the firmware file and submit another "Make Public" request at a later time (block 250).

Figure 4:
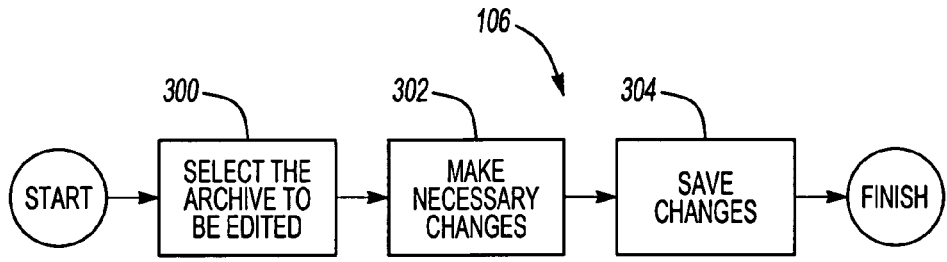
FIG. 4 is a flow diagram of an archive editing process according to one embodiment of the invention.

Editing of a given firmware file in the archive 112 can be conducted in a straightforward manner, as shown in FIG. 4, by selecting the firmware file to be edited from the archive (block 300), editing the firmware file (block 302) and saving the changes back into the archive (block 304). The actual editing itself can be conducted by the designer and/or by the review group. In one embodiment, the tool 100 allows restricting of firmware file access and editing privileges to selected users, if desired.

Figure 5:
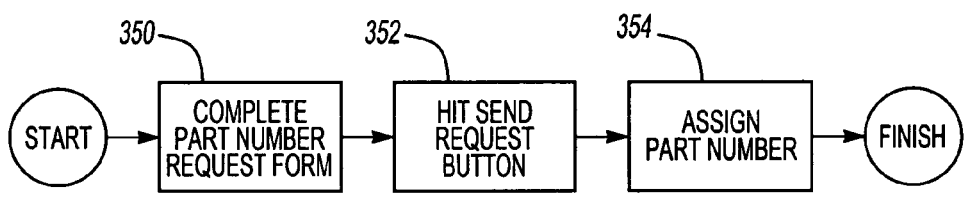
FIG. 5 is a flow diagram of a part number request according to one embodiment of the invention.

Once the review group and designer have reached a consensus that the coding in the firmware file is ready to be burned onto a chip, the status of the file is changed to "Public," as explained above with respect to FIG. 3 (block 258). The tool 100 assigns a part number to the firmware file. In one embodiment, the part number includes a program identification (PID) code and a COM code. As shown in FIG. 5, the designer or another person requests a part number by completing a part number request form (block 350) and sending the request to the tool (block 352). The tool then assigns a unique part number to the firmware file (block 354). The request form may ask for an unprogrammed part number and an unprogrammed COM code of the target device. The PID and the programmed Com code may be assigned by another system or group and placed in the archive 112. In one embodiment, the part number for the firmware file is entered directly into the archive 112 by the tool 100. Further, the part number may be automatically requested (blocks 350, 352) and assigned (block 354) as soon as the status of the file is changed to "Public" rather than waiting for a manually-initiated request.

Once all of the designing and editing is complete, a given firmware file will have archived source code and archived object code that has been made publicly available within the system and having an assigned part number. The object code is therefore read to be sent to the chip manufacturer to be burned on chips. Because the object code is obtained from a firmware file that has been created and reviewed under tight controls (e.g., via controlling the status, accessibility, and workflow via the firmware management tool 100), the final object code has already been reviewed multiple times, reducing the likelihood that the code is outdated or otherwise incorrect. Further, the archive 112 and the tool 100 provide a clear audit trail, making it easy to track the stage at which the firmware is being reviewed and developed. Archiving firmware files in a central location also eliminates the likelihood that source and object code will get lost due to, for example, personnel changes; instead, the archive 112 provides a clear record of all firmware files and the progress on each one.

Figure 6:
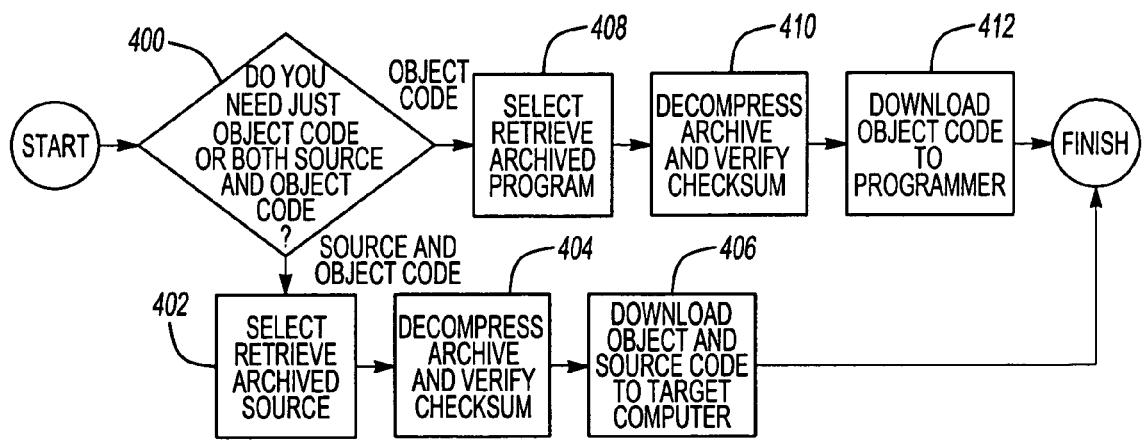
FIG. 6 is a flow diagram of an archive retrieval process according to one embodiment of the invention.

FIG. 6 illustrates a process for retrieving an archived firmware file. In one embodiment, the retrieval process provides a choice between retrieving only the object code from the archive 112 or retrieving both the object code and the source code (block 400). For example, if the chip manufacturer wants access to the firmware code, the designer would likely send the manufacturer only the object code and not the source code so that they cannot change the code. If the designer needs to make changes, however, the designer will need to access both the source code and the object code. Once the designer changes the source code, it can be recompiled to generate new object code. In other words, object code would be retrieved from the archive 112 for external use, while both source and object code would be retrieved from the archive 112 for internal use. The tool 100 may incorporate authorization codes to ensure that access to source files is given only to authorized users.

If a user (e.g., the designer) wishes to retrieve both the source and the object code (e.g., to correct the source code and generate new object code from the corrected source code), the user will select a "Retrieve Archive Source" option (block 402) in the tool 100 to select a particular source file and object file for retrieval. The tool 100 will then decompress the selected source and object files from the archive 112 and verify that they are indeed the requested files via, for example, a checksum (block 404). Once the source and object files have been verified, they are both downloaded to a selected target computer (block 406).

If a user (e.g., the chip manufacturer) is authorized only to retrieve the object code, the user will only be able to select a "Retrieve Archived Program" option (block 408). The tool will then decompress the selected archived object code, but not the source code, and verify that the object code is the correct object code via a checksum (block 410). The object code is then downloaded to the target computer, such as a computer on the chip manufacturing site (block 412). Providing the option of retrieving only the archived object code allows, for example, the designer to edit the source code, generate and archive new object code based on the edited source code, and then ask the chip manufacturer to retrieve the new object code for burning onto the chip without jeopardizing the integrity and secrecy of the source code.

As a result, the inventive firmware management tool can manage workflow for firmware development to provide oversight at every development stage. The invention therefore provides additional control over the development process to ensure that the code that is ultimately sent to the chip manufacturer is the final, correct version of the firmware code. The inventive tool therefore reduces development costs, time and waste due to miscommunication and/or misplaced files.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, this method, system and portions thereof and of the described method and system may be implemented in different locations, such as network elements, the wireless unit, the base station, a base station controller, a mobile switching center and/or radar system. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention. It is therefore contemplated that the appended claims will cover any such modifications or embodiments as fall within the true scope of the invention.

We claim:

1. A method of managing a firmware development process, comprising:
    archiving a firmware file containing at least one of firmware source code and firmware object code in an archive;
    assigning a status to the firmware file corresponding to a stage in the development process, wherein the status is also stored in the archive; and
    assigning a part number to the firmware file that provides an indication that the firmware file is ready to be burned onto a chip when the assigned status corresponds to the firmware file being ready to be burned onto a chip and wherein the firmware file cannot be. accessed to be burned onto a chip if the part number is not associated with the firmware file.

2. The method of claim 1, further comprising storing a work history of the firmware file in the archive.

3. The method of claim 1, wherein the status is one selected from a private status, a test status, and a public status.

4. The method of claim 3, wherein the private status corresponds to a design stage in the development process, the test status corresponds to a reviewing stage, and the public status corresponds to a manufacturing stage.

5. The method of claim 3, wherein at least one of the private status and the test status restricts access to the firmware file to at least one authorized user.

6. The method of claim 1, wherein the firmware file contains source code and object code, and wherein the method further comprises compressing the source code and object code before the archiving step.

7. The method of claim 1, further comprising assigning a part number to the firmware file.

8. The method of claim 1, further comprising saving edits to the firmware file.

9. The method of claim 1, further comprising retrieving at least a portion of the firmware file from the archive.

10. The method of claim 9, wherein the retrieving step comprises:
    selecting whether to retrieve the object code or both the object code and the source code; and
    retrieving based on the selecting step.

11. The method of claim 10, wherein the selecting step further comprises restricting retrieval of the source code to at least one authorized user.

12. A method of managing a firmware development process, comprising:
    saving a firmware source code and a firmware object code in a firmware file;
    archiving the firmware file in an archive;
    saving edits to the firmware file; and
    assigning a status selected from a private status, a test status, and a public status to the firmware file,
    wherein the status is also stored in the archive, wherein the private status corresponds to a design stage in the development process, the test status corresponds to a reviewing stage, and the public status corresponds to a manufacturing stage, and wherein the private status and the test status restrict access to the firmware file to at least one authorized user, and wherein assigning the public status includes assigning a part number to the firmware file that provides an indication that the firmware file is ready to be burned onto a chip and wherein the firmware file cannot be accessed to be burned onto a chip if the part number is not associated with the firmware file.

13. The method of claim 12, further comprising storing a work history of the firmware file in the archive.

14. The method of claim 12, further comprising compressing the source code and object code before the archiving step.

15. The method of claim 12, further comprising assigning a part number to the firmware file.

16. The method of claim 12, further comprising, retrieving at least a portion of the firmware file from the archive.

17. The method of claim 16, wherein the retrieving step comprises:
    selecting whether to retrieve the object code or both the object code and the source code; and
    retrieving based on the selecting step, restricting retrieval of the source code to at least one authorized user.

18. A firmware management system, comprising:
    a firmware management tool that assigns a status to a firmware file corresponding to a stage in a development process of the firmware file, the assigned status being stored in an archive with the firmware file, the firmware management tool assigns a part number to a firmware file when the assigned status corresponding to the coding in the firmware file indicates that the coding is ready to be burned onto a chip such that the firmware file cannot be used to be burned onto a chip if the assigned part number is not associated with the firmware file;
    a memory that stores a plurality of firmware files and that is accessible by the firmware management tool; and
    a user interface for accessing the firmware management tool.

* * * * *